(12) United States Patent
Frazzitta et al.

(10) Patent No.: US 7,932,921 B1
(45) Date of Patent: Apr. 26, 2011

(54) TRANSACTION SYSTEM

(75) Inventors: Bartholomew J. Frazzitta, Akron, OH (US); Randolph C. Benore, North Canton, OH (US); Daniel S. McIntyre, Uniontown, OH (US); Mark A DePietro, Canton, OH (US); Jeffrey M Kalman, Cleveland, OH (US)

(73) Assignee: Diebold, Incorporated, North Canton, OH (US)

( * ) Notice: Subject to any disclaimer, the term of this patent is extended or adjusted under 35 U.S.C. 154(b) by 1826 days.

(21) Appl. No.: 08/889,033

(22) Filed: Jul. 7, 1997

Related U.S. Application Data

(60) Provisional application No. 60/045,794, filed on May 7, 1997.

(51) Int. Cl.
*H04N 9/47* (2006.01)
(52) U.S. Cl. .......................................................... 348/61
(58) Field of Classification Search ..................... 348/61, 348/62, 159, 373, 376, 836, 838, 839, 842, 348/14.1; 358/93; 109/24.1, 37.5; 232/43.3; 340/825.35; 186/16, 37–53, 63; 221/211; 235/379; 406/31; 382/117; 715/202; 709/204; 379/167.01–173
See application file for complete search history.

(56) References Cited

U.S. PATENT DOCUMENTS

| | | | |
|---|---|---|---|
| 2,912,066 A | | 11/1959 | Ellithorpe |
| 3,294,342 A | | 12/1966 | McClure et al. |
| 3,949,364 A | * | 4/1976 | Clark et al. ................... 235/375 |
| 4,059,246 A | * | 11/1977 | Anders et al. ................... 406/31 |
| 4,073,368 A | * | 2/1978 | Mustapick ...................... 186/1 C |
| 4,311,211 A | * | 1/1982 | Benjamin et al. ............... 186/53 |
| 4,398,212 A | * | 8/1983 | Serry et al. ....................... 358/93 |
| 4,398,257 A | * | 8/1983 | Paganini et al. ............... 713/300 |
| 4,580,040 A | * | 4/1986 | Granzow et al. .............. 235/379 |
| 4,595,828 A | * | 6/1986 | Lundblad ....................... 235/379 |
| 4,638,312 A | * | 1/1987 | Quinn et al. .............. 340/825.35 |
| 4,649,832 A | * | 3/1987 | Hain et al. .................... 109/24.1 |
| 4,659,008 A | * | 4/1987 | Howett et al. ................ 232/43.3 |
| 4,681,044 A | * | 7/1987 | Dallman ....................... 109/24.1 |
| 4,735,289 A | * | 4/1988 | Kenyon .......................... 186/37 |
| 4,942,464 A | * | 7/1990 | Milatz ............................ 348/150 |
| 4,991,008 A | | 2/1991 | Nama |
| 5,036,779 A | * | 8/1991 | Capraro ....................... 109/24.1 |

(Continued)

FOREIGN PATENT DOCUMENTS

JP 4-216167 8/1992

*Primary Examiner* — Tung Vo
(74) *Attorney, Agent, or Firm* — Ralph E. Jocke; Daniel D. Wasil; Walker & Jocke

(57) ABSTRACT

A system for carrying out transactions (10) includes customer stations (18) and a service provider station (14). The system is operated in a building (12) or other facility in which a service provider operates the service provider station in a secure room (36). Audio and video communications are established between customers at the customer stations and the service provider at the service provider station. Items are exchanged between customers and the service provider through carriers (26) transmitted through a pneumatic tube system (22). A video material presentation device (50) provides promotional or other video material which is presented on displays at the customer stations. Video material is presented to customers when the customer terminal is not in communication with the service provider terminal. The customer stations are readily installed and configured in the transaction facility to maximize the floor space available for other purposes.

11 Claims, 12 Drawing Sheets

U.S. PATENT DOCUMENTS

| | | | |
|---|---|---|---|
| 5,053,868 A | 10/1991 | Higgins et al. | |
| 5,158,155 A * | 10/1992 | Domain et al. | 186/53 |
| 5,168,354 A | 12/1992 | Martinez et al. | |
| 5,181,806 A * | 1/1993 | Grosswiller et al. | 406/189 |
| 5,184,000 A * | 2/1993 | Hamada et al. | 235/379 |
| 5,283,734 A * | 2/1994 | Von Kohorn | 364/412 |
| 5,287,948 A * | 2/1994 | Casale et al. | 186/41 |
| 5,299,891 A * | 4/1994 | Grosswiller et al. | 406/112 |
| 5,483,047 A * | 1/1996 | Ramachandran et al. | 235/379 |
| 5,604,341 A * | 2/1997 | Grossi et al. | 235/379 |
| 5,661,283 A * | 8/1997 | Gallacher et al. | 235/379 |
| 5,721,536 A | 2/1998 | Mulqueen | |
| 5,740,744 A * | 4/1998 | Nashirozawa et al. | 109/24.1 |
| 5,745,160 A * | 4/1998 | Ishida et al. | 348/15 |
| 5,798,931 A * | 8/1998 | Kaehler | 364/479.01 |
| 5,816,443 A * | 10/1998 | Bustos | 221/211 |
| 5,901,238 A * | 5/1999 | Matsushita | 382/117 |
| 5,984,177 A * | 11/1999 | Do et al. | 235/379 |
| 6,002,392 A * | 12/1999 | Simon et al. | 715/702 |

* cited by examiner

TRANSACTION SYSTEM

This application claims the benefit of U.S. Provisional Application(s) No. 60/045,794 filing date May 7, 1997.

TECHNICAL FIELD

This invention relates to equipment and systems used for carrying out transactions. Specifically, this invention relates to a system for carrying out transactions between customers and a service provider, which transactions may relate to banking, gaming, ticketing, bill paying, pharmacy, postal or other services.

BACKGROUND ART

For hundreds of years many types of commercial transactions have been carried out the same way. Customers stand in line to be serviced by an individual who acts as a service provider. The service provider is positioned behind a window, desk or counter. Common examples of situations in which customers are served using this approach are in banking, gaming, post offices, pharmacies, and ticketing for movie theaters and sporting events.

Studies have shown that in this type of service environment there is often considerable time when the service provider is not working productively. This is due to a variety of factors. One factor is that a customer is not ready to start a transaction when they reach the front of the line at the counter or window. A common example is found in banking. Customers often stand in line to cash or deposit checks. Many customers do not endorse the checks until they reach the teller window. As a result, the teller who is the service provider in that situation, must wait while the customer endorses their checks. Another example is found in a gaming environment such as at a race track. The customer who reaches the betting window is often still contemplating further bets, and the clerk is required to wait while the customer makes their final selections.

Another example of unproductive time for a service provider is encountered in situations where the service provider is required to wait for equipment to operate. For example, in the banking environment if a customer is cashing a check, the teller often has to wait for approval to be received. While computerized systems are often used for this purpose, there is still a time lag. After the authorization is obtained, the teller often encounters another delay while a counting machine counts out the money for the customer. Delays waiting for equipment to operate also occur in situations such as in a ticketing environment. If a customer is buying tickets, such as tickets to a sporting event using a credit card, the cashier at the ticket window is required to wait while the customer's credit card is authorized electronically. Once the credit card is authorized, there is often further delay while printing equipment prints the customer's tickets.

A further cause of unproductive time in transaction environments is the time taken by customers to verify what has been provided to them. For example, in a banking environment a customer who has withdrawn cash or cashed a check, may stand at the teller window and recount the money. Likewise, at a gaming window a customer who has been provided with chips may count their chips. Customers who are making payments with credit cards are required to sign a slip and wisely check for the correctness of the amount stated. However, while the customer performs these activities the service provider is not performing useful work.

A further drawback associated with the conventional approach to performing service transactions is a lack of security. Many types of transactions that are performed at a counter or window involve handling significant sums of cash. Because the service provider is accessible to persons waiting to be served there is a greater possibility of robbery. In addition, because the service provider is accessible, there is a risk that a robber may cause physical harm to the service provider.

Machines have been developed to automate some types of transactions. However, machines are only suitable for performing transactions that are generally the same every time. Many transaction environments involve so many variations that a human service provider is essential.

Another type of system has been developed for servicing customers is used primarily in drive through banking environments. Such systems involve external island stations outside of a bank building. Customers position their cars adjacent to the external stations. Banking documents are transmitted between the customers in their cars and a teller inside the bank using carriers which are moved through tubes by air pressure. The teller in the bank and the customers communicate through microphone and speaker type systems. While such systems provide the convenience of in car banking for customers, they are also limited in the number and type of transactions that can be conducted. In addition, because customers perform all of the usual activities associated with conducting transactions at a bank teller window, as well as additional activities associated with positioning themselves and their car, the tellers operating the system still encounter considerable non-productive time.

Thus, there exists a need for a transaction system that is suitable for use in carrying out many types of transactions, which reduces unproductive time for service providers and which is economical to install and use.

DISCLOSURE OF INVENTION

It is an object of the present invention to provide a system for carrying out transactions between a customer and a service provider.

It is a further object of the present invention to provide a system for carrying out transactions between a customer and a service provider that is more efficient by enabling a service provider to service more customers in a given time period.

It is a further object of the present invention to provide a system for carrying out transactions between a customer and a service provider that makes more effective use of floor space within a service facility.

It is a further object of the present invention to provide a system for carrying out transactions between a customer and a service provider that provides greater security.

It is a further object of the present invention to provide a system for carrying out transactions between a customer and a service provider that is readily installed in a service facility.

It is a further object of the present invention to provide a system for carrying out transactions between a customer and a service provider that is readily expanded.

It is a further object of the present invention to provide a system for carrying out transactions between a customer and a service provider that increases customer satisfaction by allowing the customer to begin the transaction as soon as he/she is ready.

It is a further object of the present invention to provide a system for carrying out transactions between a customer and a service provider that provides a customer with information between transactions.

It is a further object of the present invention to provide a system for carrying out transactions between a customer and a service provider that may be used for carrying out many different types of transactions.

It is a further object of the present invention to provide a system for carrying out transactions between a customer and a service provider that indicates to the service provider the proper order in which to service customers.

Further objects of the present invention will be made apparent in the following Best Modes for Carrying Out Invention and the appended claims.

The foregoing objects are accomplished in a preferred embodiment of the invention by a system which includes a service provider (SP) station and a plurality of customer stations. The service provider station includes a visual display and a closed circuit television (CCTV) camera. The service provider station also includes a device for transmitting and receiving audio signals such as a microphone and speaker unit. The service provider station also preferably includes a pneumatic tube carrier delivery and receiving device. A queuing display is also included at the service provider station to indicate to the service provider the customer station which should be serviced next.

Each of the customer stations includes a visual display that can be selectively connected to the CCTV camera at the service provider station. The customer station also includes a CCTV camera that can be selectively connected to the visual display at the service provider station. The customer station also includes an audio transmission and receiving device which enables a customer to communicate orally with a service provider at the service provider station. Finally, the customer station also includes a device for delivering and receiving a pneumatic tube carrier that can be transmitted through a tube by pressure or vacuum.

The service provider station is connected to each of a plurality of customer stations. Tubing for transmitting a pneumatic carrier extends between the service provider station and each of the customer stations. The service provider station also includes a control unit that enables a service provider to connect to and communicate with a customer at a selected customer station.

The preferred embodiment of the system further includes a video material presentation device which provides video program material. The presentation device is connected to the customer stations through a video switching device. The video material presenting device provides video information that is intended to be of interest to the customers who use the system. The video switching device operates to present the video material on the display of the customer station except when the customer and the service provider are in communication.

When the customer approaches the customer station he or she is enabled to contact the service provider. The video switching device responds to the service provider so that the service provider is in visual and audio communication with the customer at the customer station. This enables the service provider to communicate with the customer as well as to receive documents from the customer through the carrier which is transmitted through a pneumatic tube.

Although the customer conducting transactions at the customer station will still engage in activities which in other environments would result in unproductive time for the service provider, the service provider is enabled to switch to communication with other customer stations to move other transactions forward while waiting for the customer. The ability of the service provider to minimize unproductive time while waiting for the customer improves service for all customers using the system. The queuing display at the service provider station indicates the customer station where the next customer who should be serviced is located.

The preferred embodiment of the system includes a novel customer station which is enabled to be installed as an integral part of a wall of a building in which the transactions are carried out. The customer station includes a work surface and other amenities for customers carrying out transactions, as well as privacy from customers at nearby stations. The customer stations are also constructed to be readily installed and serviced.

BEST MODES FOR CARRYING OUT INVENTION

Figure 10:
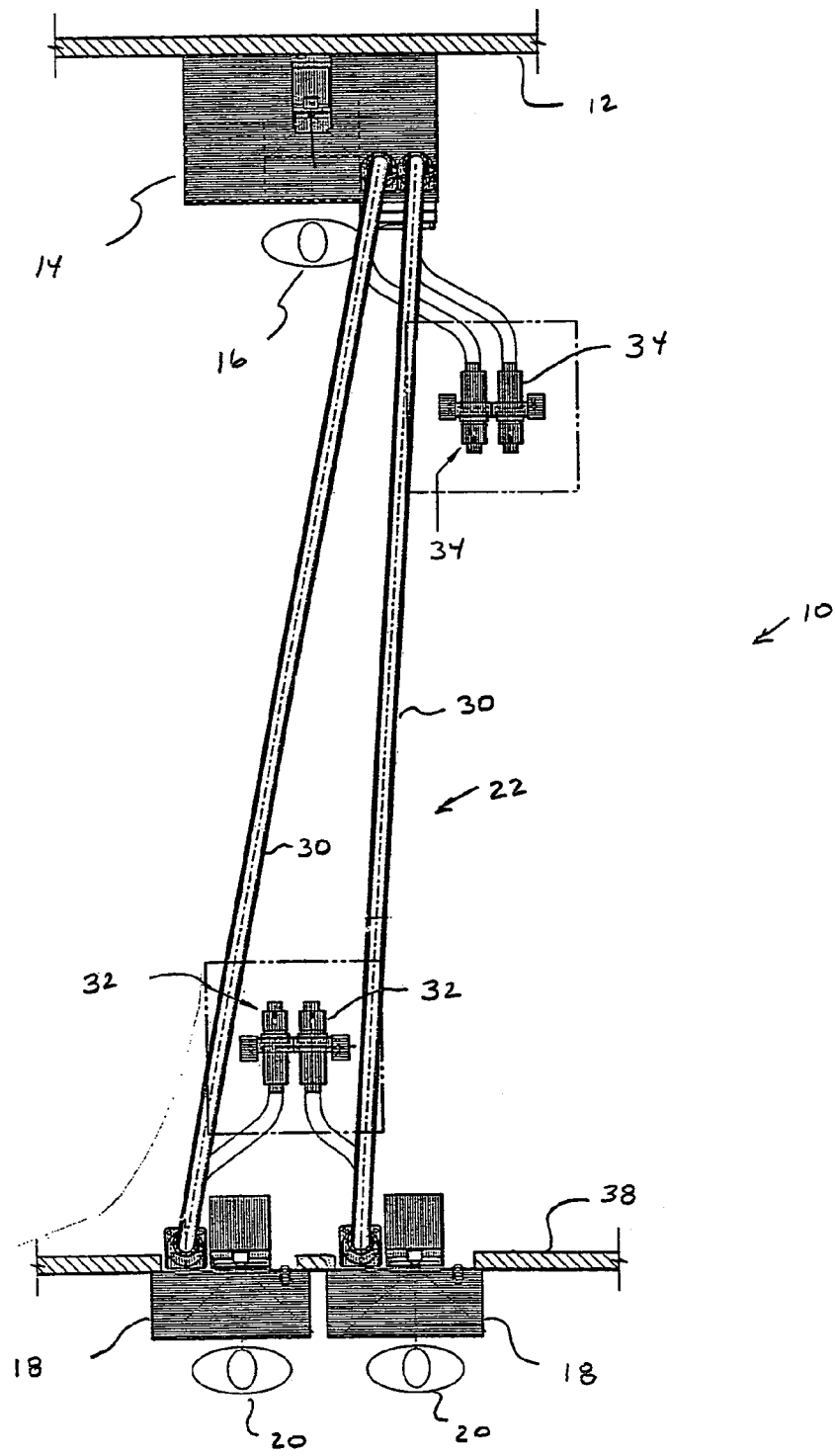
FIG. 10 is a top schematic view of a service provider station and customer stations used in a transaction system of an embodiment of the present invention.

Referring now to the drawings and particularly to FIG. 10 there is shown therein an embodiment of the transaction system of the present invention generally indicated 10. The system is used within a building or facility generally indicated 12, in which transactions are conducted. The embodiment of the system shown is specifically adapted for conducting banking type transactions. It should be understood however that the present invention may be used in a variety of transaction environments including gaming, ticketing, pharmacy, postal and other business environments where customers are served by a service provider positioned behind a desk, counter or window.

The system of the present invention includes a service provider (SP) station generally indicated 14. A service provider generally indicated 16 operates the components and equipment at the SP station. In the case of the embodiment of the system shown, the service provider is a teller or other bank employee that carries out transactions for customers in a manner which is later described.

The system also includes a plurality of customer stations 18. Customers generally indicated 20, operate the customer stations 18 to carry out transactions with the service provider 16 in a manner that is later described in detail.

Figure 11:
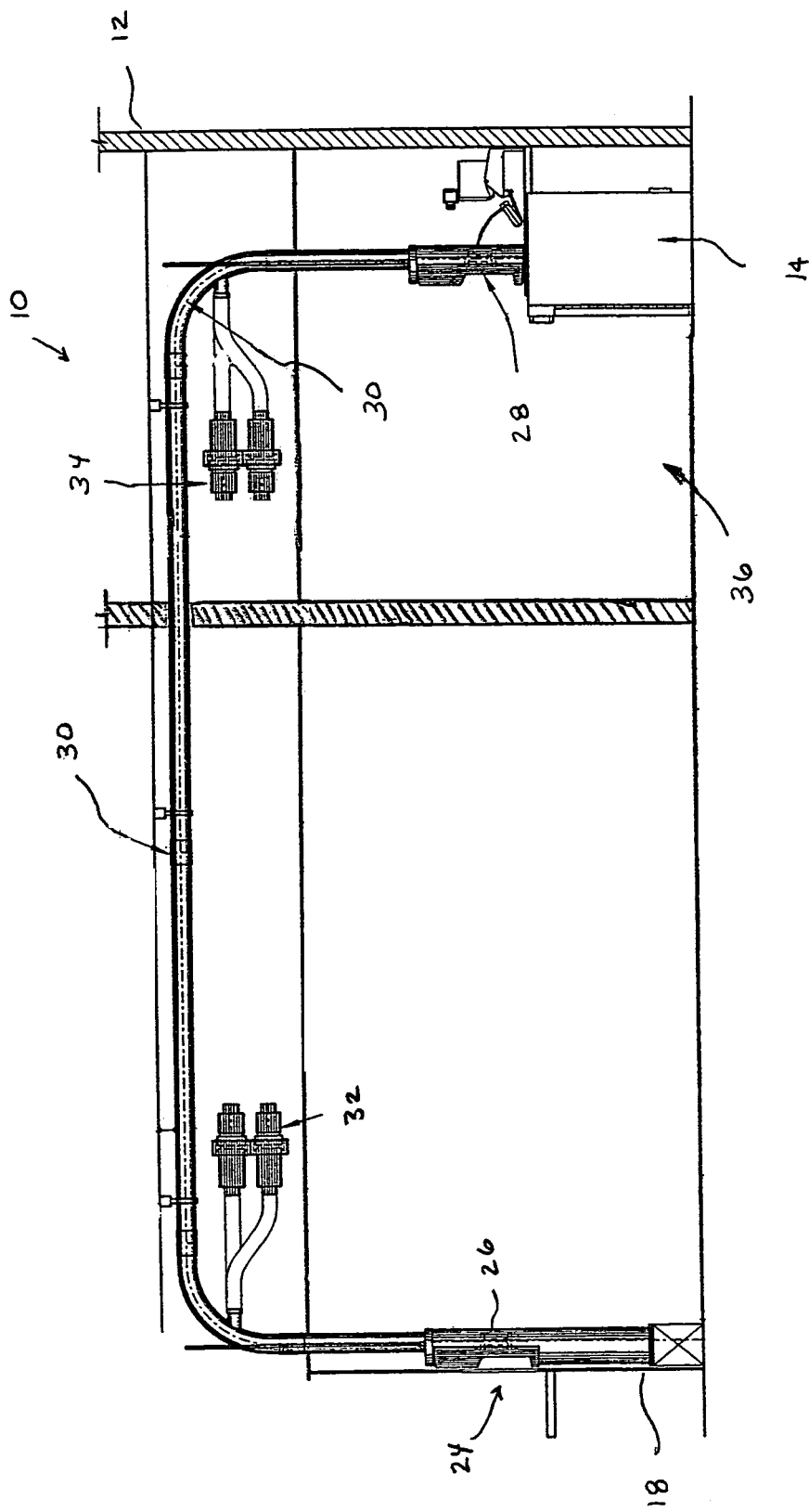
FIG. 11 is a side schematic view of the system shown in FIG. 10.

The customer stations 18 and service provider station 14 are connected through a pneumatic tube type transport system generally indicated 22. As shown in FIG. 10 each customer station 18 is connected to the SP station by a carrier tube 30. The customer station includes a pneumatic pressure/vacuum tube carrier delivery and receiving device 24 which can send a carrier 26 to the SP station and which can receive a carrier from the SP station (see FIG. 11). The SP station also includes an air pressure tube carrier and delivery and receiving device 28 which is used to send the carrier 26 to the customer station 18, and to receive the carrier from the customer station.

Carrier delivery and receiving devices 24 and 28 are connected by the carrier tube 30 through which carrier 26 passes. The carrier is propelled through the tube by air pressure or vacuum produced by blowers 32 and 34. Movement of the carrier is accomplished by operating the blowers to produce a differential in air pressure in the tube which is sufficient to move the carrier from one station to another. In a preferred embodiment of the invention blowers 32 and 34 are a blower package, which along with the tube and carriers are commercially available from Diebold, Incorporated.

In the preferred embodiment of the present invention the SP station is positioned within a secure room generally indicated 36 within the building 10. Positioning the SP station 14 in such a secure room enhances security and minimizes the risk that the service provider will be subject to robbery or physical harm. In addition, in the preferred embodiment the customer stations 18 are built into a building wall generally indicated 38. Building wall 38 is preferably an interior wall of the building 12. As later discussed, an advantage of the present invention is that the customer stations may be readily installed in a building wall and require a minimum of surrounding floor space.

Figure 8:
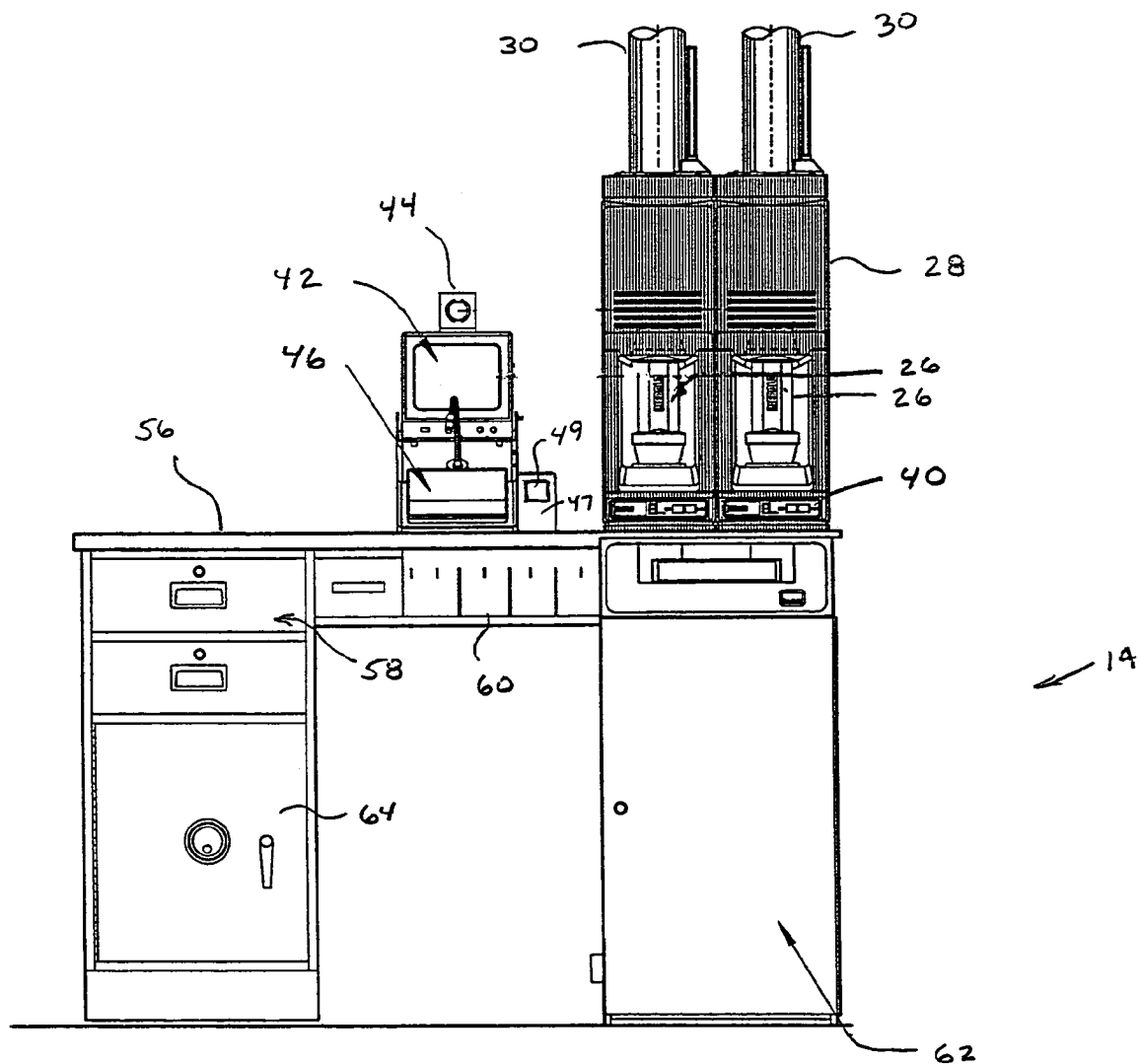
FIG. 8 is an elevational view of a first embodiment of a service provider station.

The service provider (SP) station 14 of system 10 is shown in greater detail in FIG. 8. The SP station includes two carrier delivery and receiving terminal devices 28. Carriers 26 may be transmitted to and from the customer stations 18 through the terminal devices 28. The delivery and receiving terminal devices 28 each include a control panel 40. The control panel 40 includes buttons which the service provider presses to control the operation of blowers 32 and 34 which cause the carriers 26 to move.

The service provider station 14 further includes a visual display 42. Visual display 42 is preferably a closed circuit television (CCTV) monitor. SP station 14 further includes a CCTV camera 44. Camera 44 is preferably positioned adjacent to the visual display 42 so that when the service provider views the customer at a customer station on display 42, camera 44 provides an image of the service provider on a visual display at the customer station. The service provider appears to be looking at the customer as a result of this arrangement.

SP station 14 further includes a communication selector unit 46. Communication selector unit 46 includes an audio transmission and receiving device including a microphone and a speaker. Unit 46 further preferably includes selector buttons or other input means by which the service provider may selectively actuate to establish video and audio connections between the SP station and a selected customer station. The video/audio communication selector unit 46 further preferably includes an indicator such as a light which is used to indicate to the service provider that a customer is present at a particular customer station. This is done in a manner that is later explained.

The communication selector unit 46 is in operative connection with a communication controller (not shown). The communication controller is preferably a programmable microprocessor based controller which is operative to selectively establish audio and video communication between the SP station and a particular customer station responsive to the service provider's inputs to unit 46. The SP station 14 is also in operative connection through the communication controller with a video switching device generally indicated 48 in FIG. 12. The video switching device is preferably a video matrix switcher commercially available from Diebold, Incorporated. The video switching device is operatively connected to the camera 44 and display 42 of the SP station 14 as well as to the visual displays and cameras located at the customer stations.

A video material presentation device generally indicated 50 is operatively connected to the video switching device 48. In the preferred form of the invention the video material presentation device is a computer which includes a data store therein. The data store stores data representative of video and/or audio material. In the preferred embodiment the video/audio material stored in the data store of the computer is advertising, promotional information or other material which is intended to be of interest to customers who use the system. In alternative embodiments the video material presentation device could be a playback device such as a VCR, or an online or broadcast source.

The computer 50 is preferably connected to a data transmission line 52 through a communications device 54. The communications device is preferably a modem and the data transmission line is a phone line or other device which is suitable for placing the computer that serves as the video material presentation device in communication with a remote data source. As will be appreciated by those skilled in the art this configuration enables the video and/or audio information that is stored in the computer to be changed and updated on a scheduled or unscheduled basis from a local or remote location. This enables the information stored in the data store of the computer to be maintained as current and accurate as may be desired by the operator of the system.

It should be understood that the computer which serves as the video material presentation device may be located immediately adjacent to the SP station 14, or may be remotely located and connected to the video switching device 48 by a data transmission line, radio link, or other communications apparatus.

The SP station 14 also includes a queuing indicator 47. The queuing indicator 47 includes a display 49, such as an LED or LCD type. The queuing indicator 47 also preferably includes a processor and a memory therein which enables it to carry out programmed functions and also serves as a timing device. The queuing indicator 47 provides an indication on its display 49 of the customer station where the next customer to be serviced is located. The queuing indicator operates in a manner later explained and assures that the service provider can service the customers in the order that they approached the customer stations.

As shown in FIG. 8 SP station 14 further includes other components which are tailored to the particular types of transactions being performed. As shown in FIG. 8 the SP station 14 includes a working surface 56 which provides the service provider room to review and prepare materials associated with the transactions.

The SP station 14 further includes storage drawers 58 and open storage locations 60 for items that the service provider may need while performing their work. As the embodiment of the system 10 is intended for use in a banking environment the SP station 14 further includes a currency bill dispensing device 62. Currency dispensing device 62 is of a known type which dispenses bills and coinage to the service provider in amounts requested. This avoids the need for the service provider to count amounts of money when needed for delivery to a customer. The service provider station further includes a built in safe generally indicated 64 which provides secure storage for valuable items, such as checks and currency.

It should be understood that other embodiments of the invention may include different or additional devices at the SP station which are needed in the particular transaction environment in which the system is used. These may include, for example, credit card authorization devices, ticket printers, betting slip printers, stamp dispensers, chip dispensers, medicine dispensers or other items which are needed to carry out the particular types of transactions required in the environment in which the system is used.

Figure 9:
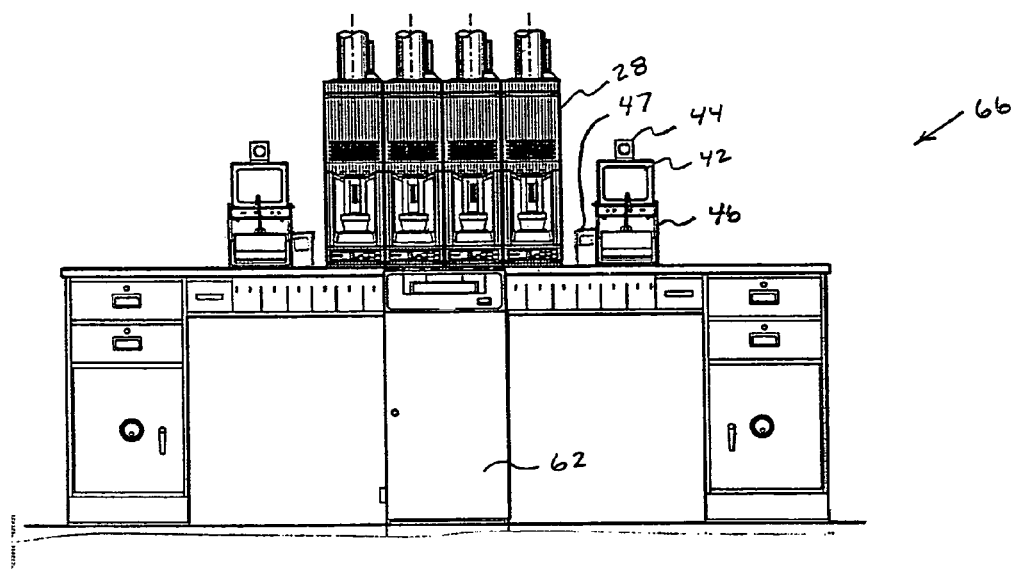
FIG. 9 is an elevational view of a second embodiment of a service provider station.

FIG. 9 shows an alternative service provider station 66 for use in embodiments of the invention. Alternative SP station 66 is similar to SP station 14 except that it includes additional carrier delivery and receiving terminal devices 28. The alternative SP station 66 also includes additional displays 42, cameras 44, and communication selector units 46. The alternative SP station 66 is arranged for a system where two service providers may share a single currency dispensing device 62. Alternatively, SP station 66 may be used by a single service provider who operates all of the components thereon.

It should be understood however, that while the SP stations 14 and 66 have been shown as having two customer stations 18 associated with a single display and communication selector unit, in other embodiments other numbers of customer terminals may be configured to be serviced from a single selector unit by a service provider. The configuration of the system may be tailored to the transaction environment in which it is used.

The preferred embodiment of the customer stations 18 is shown in greater detail in FIGS. 1 through 7. Customer station 18 is positioned on a wall 38 of building 12. Although wall 38 can be virtually any wall, an advantage of the preferred embodiment of the invention is that wall 38 is an interior wall which may be a facade with very limited room behind it. This enables positioning the customer stations in ways that maximize available space within the interior of the building.

Customer station 18 includes a cover 68 which in the operative position of the station abuts wall 38 as shown. As later explained, cover 68 is moveable in the preferred embodiment so as to provide access for servicing the components of the customer station.

Figure 4:
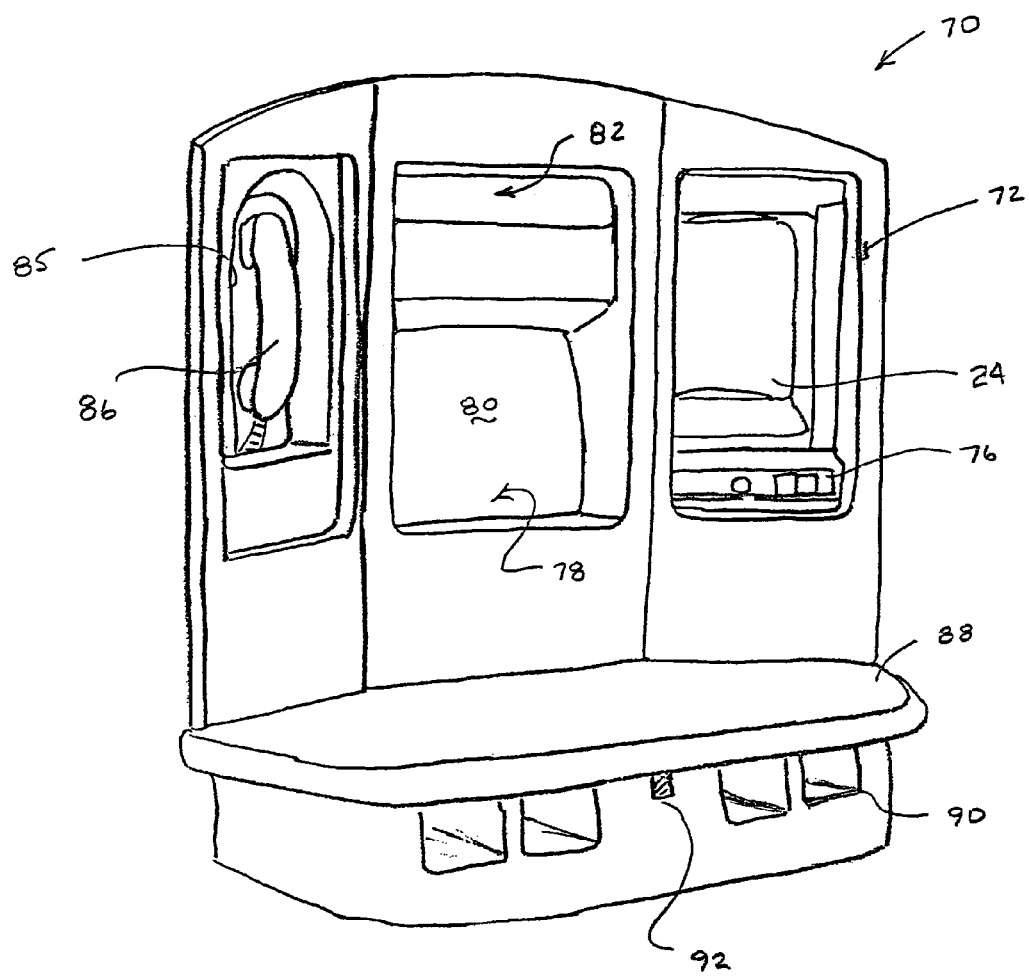
FIG. 4 is a right front perspective view of the customer interface of the customer station shown in FIG. 1.

Cover 68 has thereon a customer interface area 70 which is shown in greater detail in FIG. 4. The customer interface area includes a carrier opening 72 which extends through the cover 68. The pneumatic tube carrier delivery and receiving terminal device 24 is accessible through opening 72 in the operative position of cover 68. Carrier delivery and receiving terminal device 24 operates to send and receive carriers 26 through the pneumatic tube system 22, to and from the service provider terminal. Carrier delivery and receiving terminal device 24 includes a control panel 76 with buttons thereon so that a customer may control the operation of blowers 32 and 34 in the manner previously explained to send a carrier from the customer station to the SP station. Control panel 76 preferably also includes a button that a customer can press to call the service provider at the service provider station.

Customer interface area 70 of cover 68 further includes a screen access opening 78. In the operative position of the customer station, a visual display 80 is enabled to be viewed by the customer through the screen access opening 78 in the cover 68. Interface area 70 further includes a camera viewing opening 82. Camera viewing opening 82 is positioned so that in operative position of the customer station a CCTV camera 84 (see FIG. 5) is enabled to view the customer through opening 82 in the cover.

Customer interface area 70 of the preferred embodiment further includes an accessory opening 85. An audio transmitting and receiving device 86 is positioned in accessory opening 85. In the preferred embodiment of the invention the audio transmitting and receiving device 86 is a telephone type handset. The customer at the customer station 18 is enabled to communicate with a service provider at the SP station through the handset. This provides added privacy. A microphone and speaker are also preferably built into terminal device 24 and may be used to communicate with the customer when the handset is not in use. In the preferred embodiment the handset is in connection with a switch which operates to switch audio communication from the microphone and speaker to the handset when the handset is raised and to return to the microphone and speaker when the handset is replaced. The handset switch is also preferably used to signal the service provider in a manner similar to the "call button" on the control panel 76 when the customer first approaches the customer station. Of course, in alternative embodiments, the handset may be deleted and/or other types of microphone and speaker arrangements may be used.

In the preferred embodiment of the customer station 18 the carrier opening 72 and the accessory opening 85 are positioned in mirror image relation on the cover 68. This enables the positions of the terminal device 24 and the audio transmission and receiving device 86 to be reversed from those shown in FIG. 4. Alternatively, in customer stations that do not have one of these components the unused opening may be closed by an insert attached to the cover.

The customer interface area 70 further includes a shelf 88. Shelf 88 provides a horizontal work surface for the customer which facilitates carrying out transactions at the customer station. Shelf-88 provides a location for the customer to hold articles as well as to sign documents or make notes. A plurality of storage locations 90 are shown positioned underneath shelf 88 in the customer interface area. Storage locations 90 are used in the embodiment shown for holding documents that a customer may need for carrying out a banking transaction. These include for example, deposit tickets or other form banking documents that may be used by numerous customers.

The embodiment of the invention shown further includes a sensor 92 in the customer interface area 70. Sensor 92 is preferably an optical type sensor or other sensor which is operative to sense that a customer is present at the customer station 18. In the embodiment of the invention shown, sensor 92 is operatively connected to the indicator on the communication selector unit 46 at the service provider station. When a customer is detected adjacent to the customer station by the sensor 92 an indication is given to the service provider through an indicator on the selector unit 46. The sensor is also in connection with the queuing indicator 47 which indicates to the service provider on its display the customer station where the next customer to be serviced is located.

Other approaches to notifying the service provider may also be used. For example, when the customer picks up the handset which comprises the audio transmitting and receiving device 86 the service provider may be similarly provided with an indication that a customer is present at the customer station 18 and is ready to conduct a transaction. The customer may also notify the service provider by pressing the "call button" on the control panel 76 of terminal device 24. Written instructions may be provided in the customer interface area 70 to instruct the customer on what to do to contact the service provider when they are ready to begin a transaction. This may also include sending documents to the service provider in the carrier.

In the embodiment shown, the customer station is comprised of components which include camera 84, display 80, carrier terminal device 24 and audio transmission and receiving device 86. In other embodiments of the invention customer stations which include different or additional components may be used.

As shown in FIGS. 2 through 7, cover 68 is supported on a frame 94. Frame 94 is in supporting connection with wall 38. In the preferred embodiment the frame 94 is a conventional door frame which may be used for supporting a standard personnel door thereon. Frame 94 bounds an opening generally indicated 96 in wall 38. Frame 94 includes a first upright member 98 and a second upright member 100. Frame 94 also includes a header member 102 which extends between the upright members.

First upright member 98 has hinges 104 operatively connected thereto. Hinges 104 are operatively connected through fasteners which attach to frame 94 in the conventional hinge attaching areas of the door frame. Hinges 104 are operatively connected to cover 68. Hinges 104 enable cover 68 to be moved from a closing position to an open position.

Figure 1:
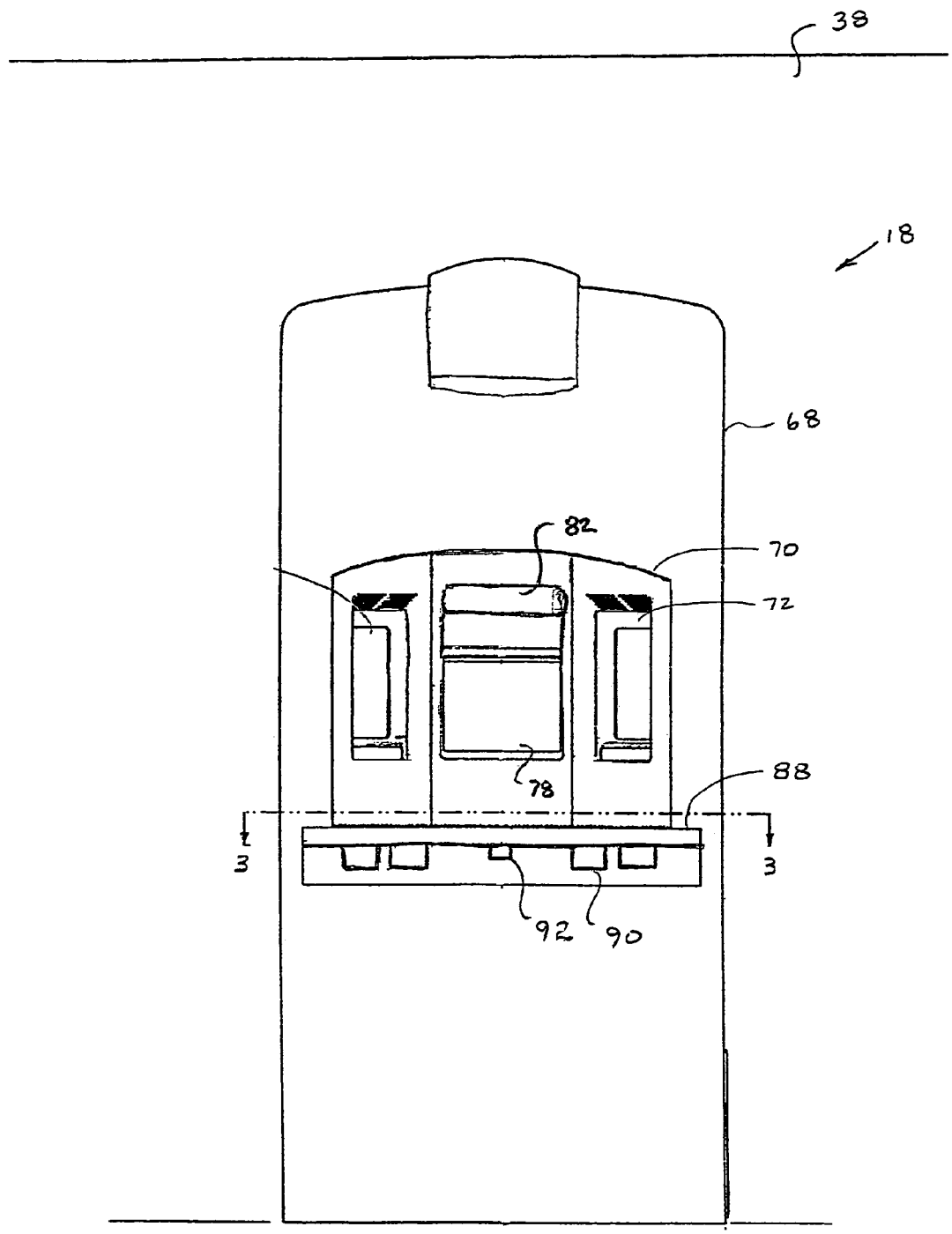
FIG. 1 is a front elevational view of a customer station of a preferred embodiment of the system of the present invention.
Figure 2:
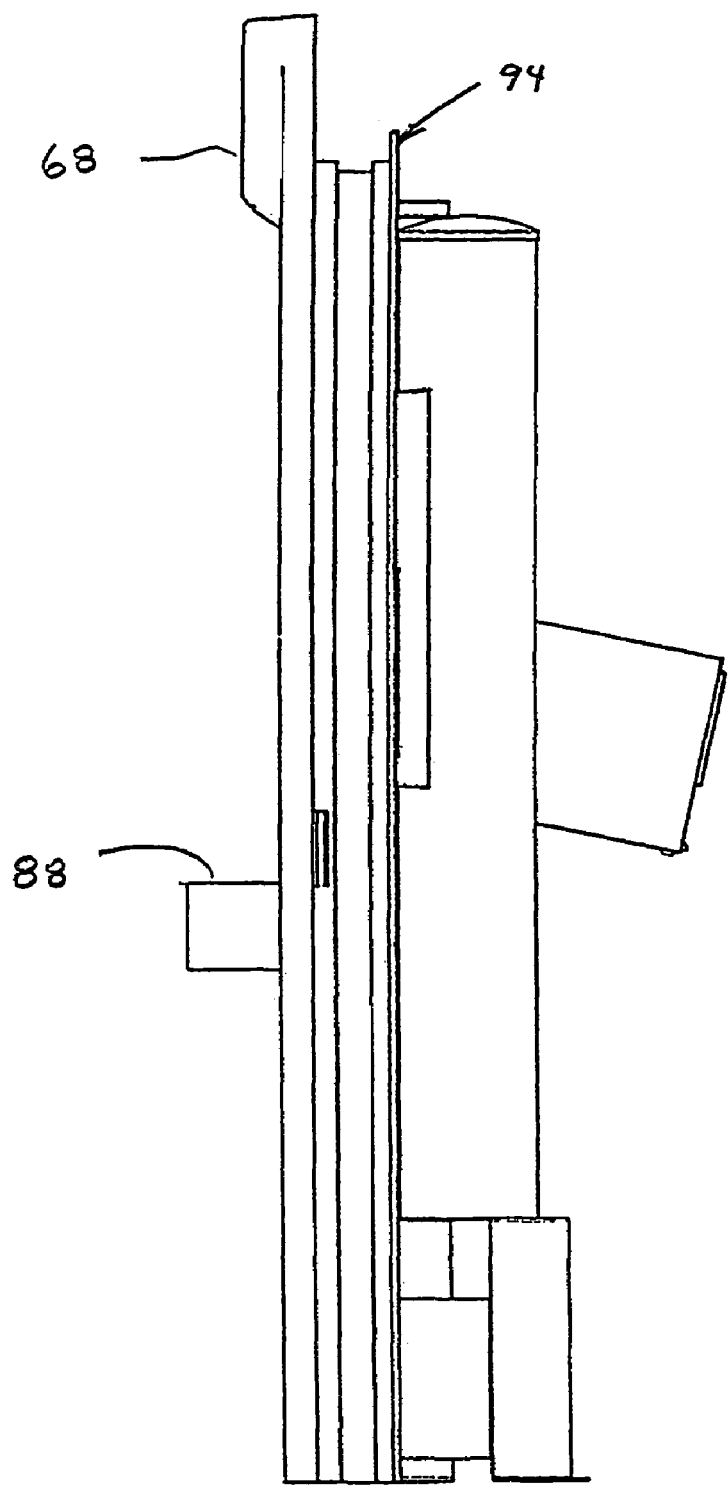
FIG. 2 is a side view of the frame and components of the customer station shown in FIG. 1.
Figure 3:
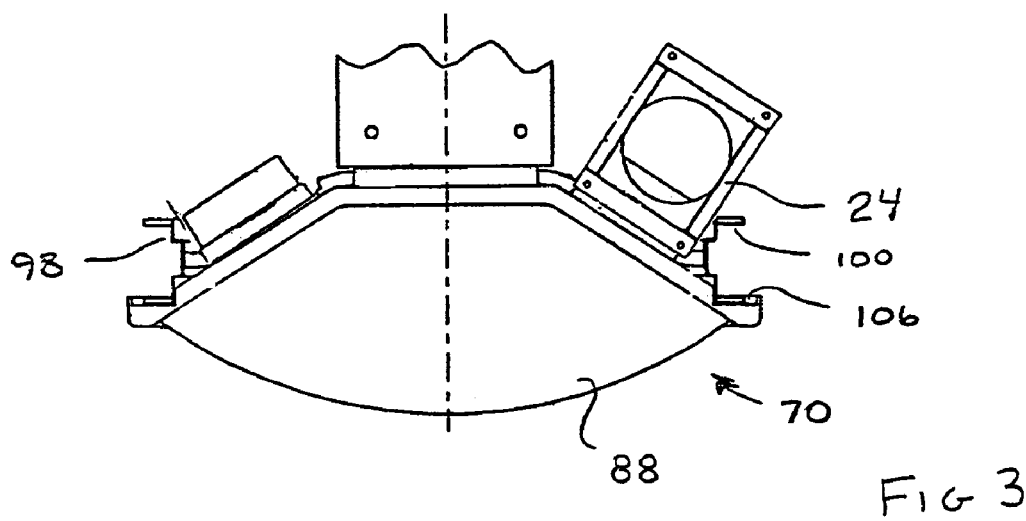
FIG. 3 is a top sectional view of the customer station taken along line 3-3 in FIG. 1.

In the closing position shown in FIGS. 1 and 2, cover 68 is in abutting relation with the wall 38 in which the frame extends. In the closing position cover 68 overlies the frame 94 and the opening 96 as well as a portion of the wall adjacent thereto.

Cover 68 is enabled to be moved by authorized personnel to rotate in connection with hinges 104. Once the cover is moved to an open position, opening 96 and the components of the customer station which are accessible through the opening may be accessed by the authorized personnel. In the preferred form of the invention, second upright member 100 includes a striker schematically indicated 106. The striker is enabled to selectively engage a locking mechanism on the cover 68. The locking mechanism is used to prevent unauthorized personnel from opening the cover.

Figure 5:
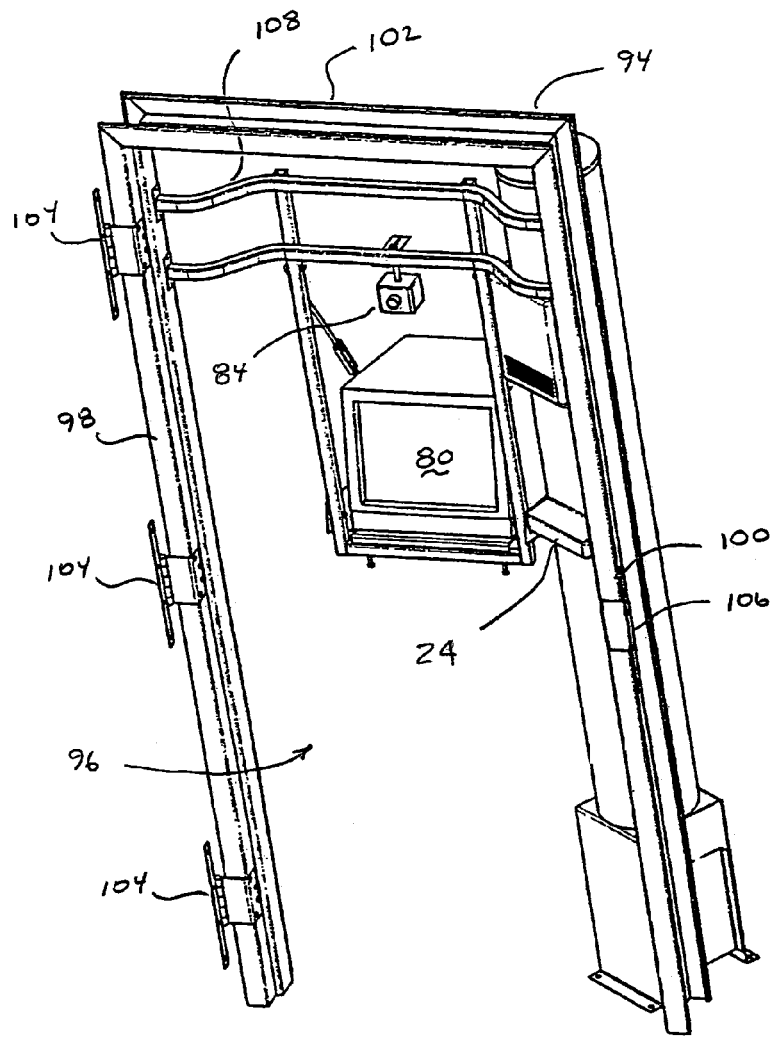
FIG. 5 is a right front perspective view of the frame and components of the customer station.
Figure 6:
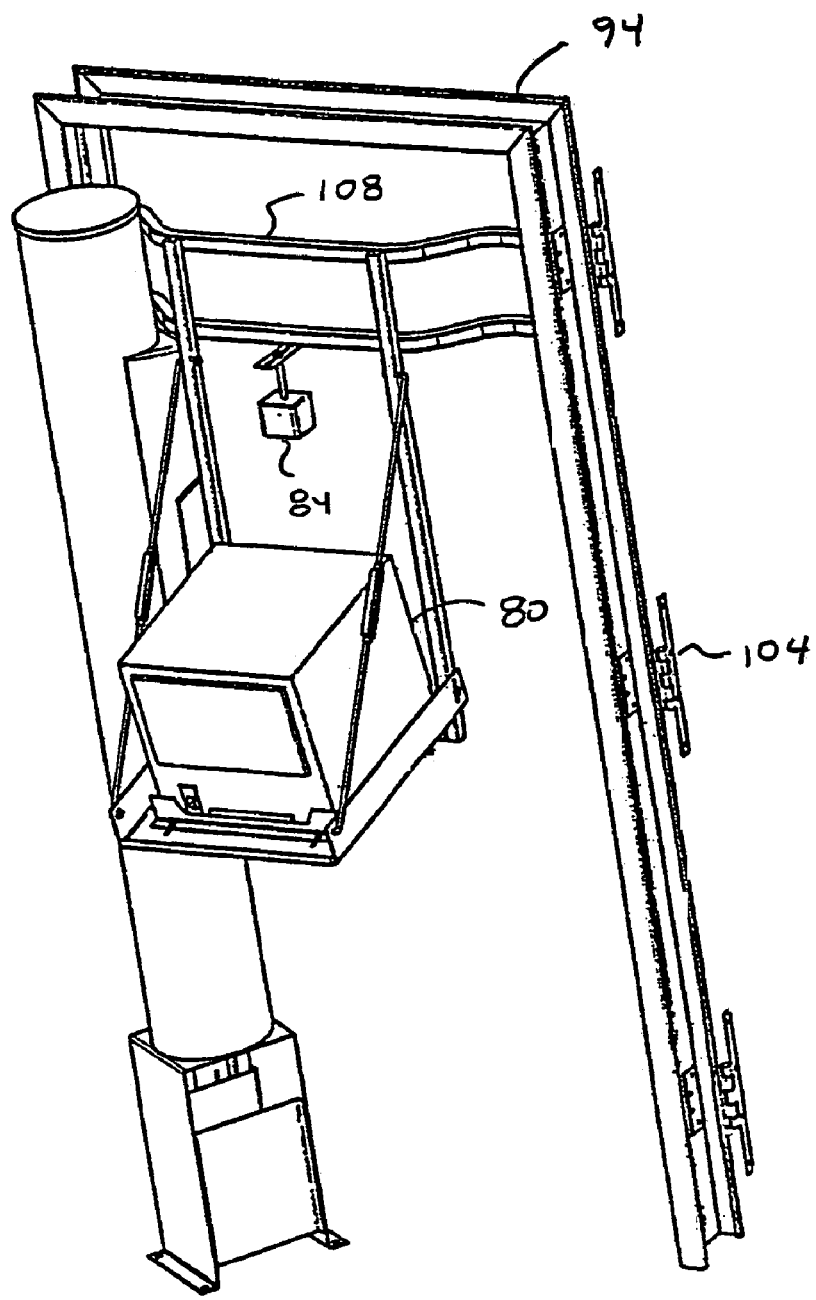
FIG. 6 is a right rear perspective view of the frame and components shown in FIG. 5.
Figure 7:
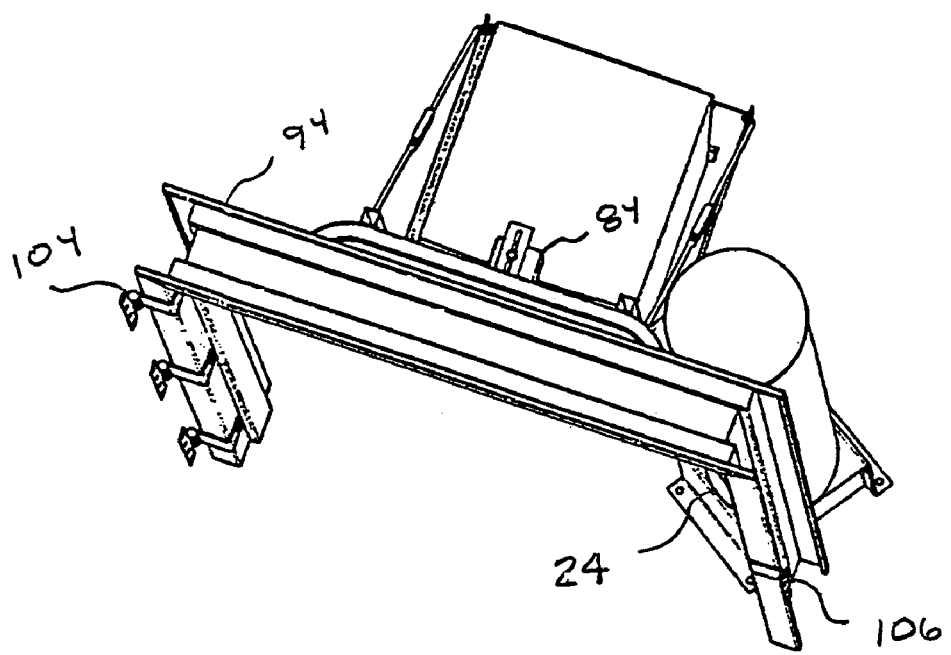
FIG. 7 is a right top perspective view of the frame and components shown in FIG. 5.

As best shown in FIGS. 5, 6 and 7, a subframe 108 is attached to upright members 98 and 100. This is done in the preferred embodiment using conventional fasteners. This construction enables subframe 108 to be in supporting connection with wall 38. Subframe 108 supports CCTV camera 84 which is mounted thereto through an adjustable mounting bracket. Subframe 108 further is in supporting connection with visual display 80 which is also mounted in a manner which enables it to be movably positioned relative to the subframe. Subframe 108 is further in supporting connection with carrier and delivery device 24. These components of the customer station which are in supporting connection with the wall 38 through the frame 94 and subframe 108, are rendered accessible by opening cover 68 which facilitates the servicing thereof. Opening cover 68 also enables servicing components such as the handset which serves as the audio transmitting and receiving device 86, as well as the sensor 92, both of which are preferably mounted in supporting connection with the cover 68.

As can be appreciated from the foregoing description, the components of the customer station may all be accessed by opening cover 68. In the preferred embodiment there is no requirement that rear access to the customer terminal be provided. As a result, wall 38 may be in close proximity to other objects such as a fixed wall, which enables maximizing available floor space in the customer area. In addition, cover 68 is preferably provided with mounting areas which enable it to be attached by fasteners to hinges in either a left or right hand opening configuration. This further enables optimization of available space.

A novel aspect of the preferred embodiment is that the customer station is built around a door frame. This enables a facility to be constructed with walls having standard door openings which can be later modified to become customer stations. If an operator of a facility does not wish to have all customer stations installed initially, the frames may be fitted with conventional doors until such time as customer stations are to be installed. In addition, because customer stations of the preferred embodiment do not require rear access, they may be installed in locations that may have been originally provided for closets or other storage. This enables ready conversion of another type facility to include the stations. Customer stations may be installed in other areas from which no rear access is provided such as in building corners. Because the carrier tubes 30 as well as the electrical wiring connections with the customer stations 18 can extend in any direction from the customer stations, either overhead or underfloor, the preferred embodiment of the present invention may be readily installed in numerous locations to facilitate the conduct of transactions.

In operation of the transaction system of the described embodiment, the displays 80 of the customer stations 18 are generally used to present video material when the stations are not being operated by a customer. Video program material (and audio as well if desired) is stored in the data store of the computer which serves as the video presentation device 50. The displays 80 of customer stations 18 are provided with signals representative of the video and/or audio material from the computer through the video switching device 48. As previously discussed, the video or audio presentation material in the video presentation device may be periodically or otherwise updated from a local or remote location using data transmission line 52 and communication device 54.

Figure 12:
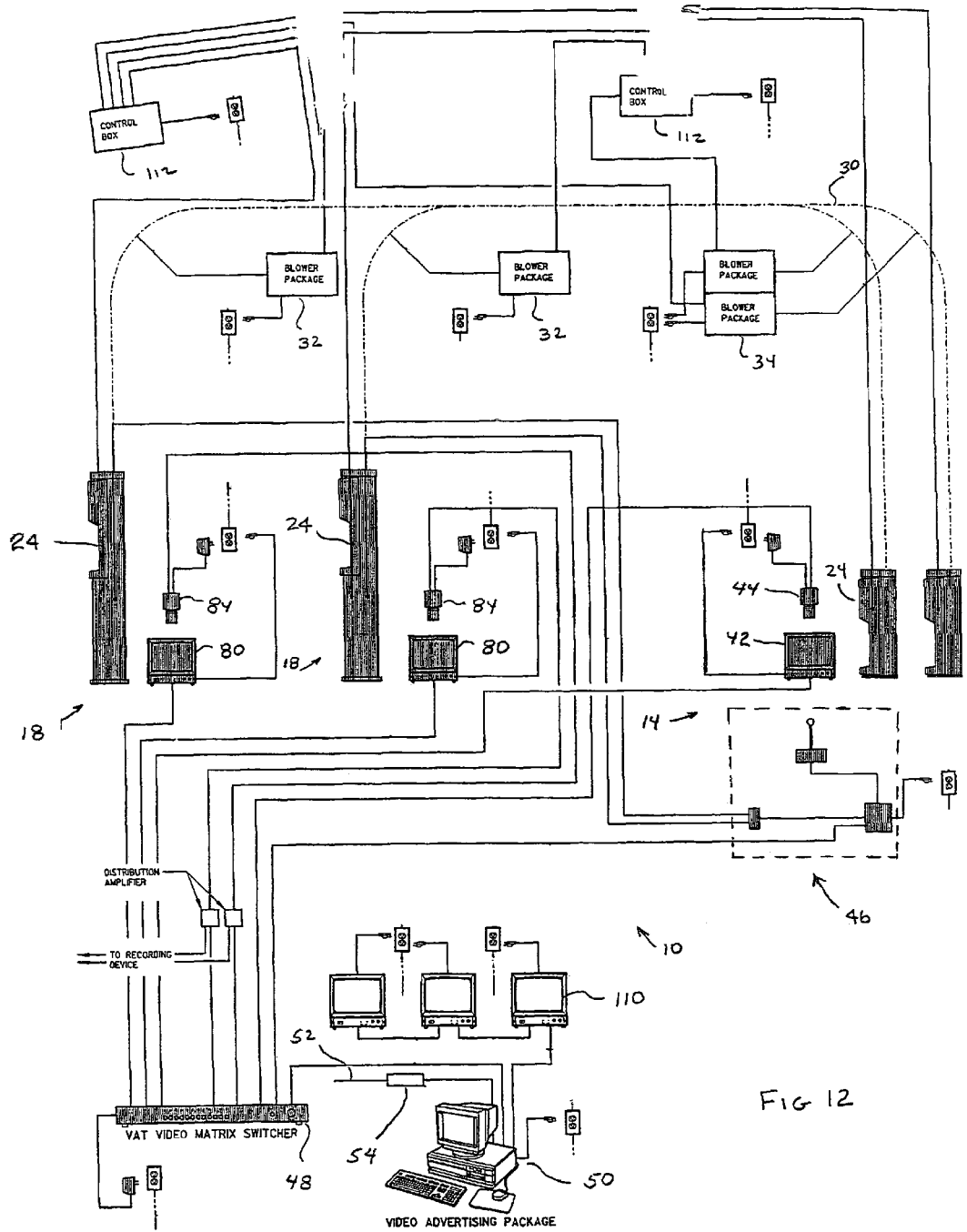
FIG. 12 is a schematic view showing the electrical and pneumatic connections between the components of the system shown in FIG. 10.

As shown in FIG. 12 in a preferred form of the system additional video and/or audio monitors 110 are provided to display the material from the video material presentation device. Monitors 110 may be positioned in the building 12 which houses the system either in the secure area where the service provider is located, in the customer transaction area, or both. Monitors 110 enable service providers to review the information that is being presented in the event they are questioned by a customer about it. In addition, customers who may not be interested in conducting a transaction or who have already completed a transaction may be interested in reviewing the material being presented. The installation of monitors 110 in the customer area enables customers to easily do this without occupying a customer terminal 18.

Continuing with the description of an exemplary transaction, a customer approaches a customer station 18 and is sensed by sensor 92. This causes an indicator to flash at the service provider's communication selector unit 46. Alternatively, a customer may pick up the handset on the customer station or press the "call button" on terminal 28 to provide a similar indication to the service provider. The signal from the customer station is also received at queuing device 47. The queuing device 47 preferably includes a timing device, such as a processor which notes a relative or real time of the customer's arrival and stores the information in a memory in connection with the processor in device 47. The queuing device preferably generates an order for servicing customers based on a time sequence in which customers arrived at the customer stations. The processor is operative to generate on the display 49 an indication of the next customer station to be serviced based on the order which includes data representative of the station where the next to arrive customer is positioned. This tells the service provider which customer should be serviced next.

The service provider provides an input to unit 46 to select the customer station where the customer is present. The communication controller operates in response to the input to establish two way video and audio communication with the station where the customer is present. When the service provider establishes this two way audio and video communication the video switching device 48 operatively disconnects the display and audio output devices at the customer station from the video presentation device 50.

The queuing device 47 which is also in operative connection with the selector unit 46, deletes or otherwise changes the order data responsive to the input which places the service provider station and the customer station in communication. As a result of the modification of the order data the display 49 no longer displays the number or other designator for the customer station the service provider has now selected, and displays the designator for the customer station where the "next" customer is waiting, if another customer is present. The queuing indicator is operative not to place the customer station in the order again while the SP station is in communication with the customer station.

By communicating with the customer the service provider can answer the customer's questions and can help the customer to conduct a transaction. If the customer is not ready to proceed, the service provider may operate the communication selector unit 46 at the SP station 14 to disconnect audio and video communication with that particular customer station, and may proceed with another customer's transaction by establishing communication with another customer station. Often the customer at the first station will be instructed to insert documents into a carrier 26 and to transmit the carrier to the service provider using the carrier delivery and receiving terminal device 24 on the customer station. As a result, while the customer is getting documents ready to insert in the carrier and to transmit them in the carrier, the service provider may be conducting other transactions for other customers. The service provider will know that the customer at the customer station is ready to move forward when the carrier arrives at the service provider carrier delivery and receiving terminal device 28.

The service provider disconnects the audio and visual communication between a customer station and the service provider station through an input to selector unit, such as by pushing a button. The signals from the service provider's selector unit 46 are transmitted to the communication controller which operates the video switching device 48. Video switching device 48 operatively reconnects the display 80 on the customer station with the video material presentation device 50. As a result the promotional or other material stored therein will be presented to the customer during portions of the transaction.

In certain embodiments the computer or other apparatus which serves as the video material presentation device may run in a single output mode continuously, sending the same information simultaneously to all the customer stations. However, in alternative embodiments, multiple output channels may be provided so special material may be presented while the customer is conducting a transaction. These special presentations may be specifically tailored to matters which are expected to be of interest to a customer. The computer may be programmed to provide multiple output channels which are controlled through the communication controller so that the presentation to the customer picks up at the point the presentation was interrupted by the service provider connecting the audio and visual link between the service provider station and the customer station. This increases the probability that the customer will view the entire presentation. Of course, in other embodiments other arrangements may be used such as providing a "transaction in progress" screen at the customer terminal while the customer is waiting for a response from the service provider, or connecting the signal from the camera 84 at the customer station to the display 80 at the same station so that the customer sees himself or herself (as well as perhaps a portion of the area behind them) while a transaction is in progress. These and other options can be achieved by those skilled in the art based on the disclosure herein through the programming of the video switching device 48 and video material presentation device 50.

The transmission of carrier 26 through the carrier tube 30 is achieved by differences in air pressure produced by blowers 32 and 34 which are connected at the ends of each tube. The blowers are controlled by the customer at the customer terminal and the service provider at the service provider terminal by actuating the buttons on the control panels 76 and 40 respectively. These control panels are connected to blower controllers 112 which cause the blowers to operate in the manner desired to move the carrier between the customer and service provider terminals.

Transactions carried on using the system of the invention may include the transmission of documents or other items between the customers and service providers using the carriers 26. Transactions also include the exchange of information between the customers and the service providers. This may enable the service provider to instruct the customer on how to operate other devices or otherwise obtain what is required on a self service basis. In addition, the direct communication that is available between the customer and the service provider enables the service provider to verify customer information or identification by directly viewing the customer. The system is particularly useful for providing services to individuals having disabilities who may need assistance or other information.

The method for audio communication in the preferred embodiment of the customer station 18 which includes external microphone and speakers with an optional handset provides enhanced security for audio communications that are exchanged between customers and service providers. The semicircular configuration of the customer interface area 70 of the preferred embodiment limits the ability of nearby customers to observe activities that are being conducted at a terminal. This enables the spacing of customer terminals of the preferred embodiment to be in close proximity while minimizing the concern that confidential information may be intercepted.

When a customer has finished a transaction he/she may remain at the customer station for a time to review or put away items. The queuing indicator 47 preferably has its processor programmed to require sensor 92 at the customer station to clear and no longer sense a customer and then subsequently sense another customer before again including in the order data representing that a new customer is present at the customer station. The programming of the processor in the queuing device preferably requires the sensing condition to exist for a period of time after the customer station senses a new customer, before the customer station is again added into the service order generated by the queuing device. This increases the reliability of the queuing indicator.

The system of the present invention in addition to providing flexibility for a wide variety of customer transactions, also provides enhanced security for the service provider. Because the service provider is located in a secure area of the building, service providers are less susceptible to robbery or physical harm. This can be very important where transactions involving significant amounts of cash are involved, such as in gaming or banking establishments.

The embodiment of the system which includes the video and/or audio presentation device 50 enables the presentation of promotional material to the customers. Providing additional information often serves to increase customer satisfaction and can also result in increasing the number of transactions carried out. Such a system may further provide customers with directions on how to operate the customer stations or with other activities which are carried out in the facility. Alternatively, device 50 may transmit real time signals from another source. This may be particularly desirable in gaming establishments.

Alternative embodiments of the system may include features that enable customers to selectively access information. For example, displays 110 in the customer area may be provided with customer input devices such as a touch screen interface. Such an interface may be operated in conjunction with the material presentation device 50 so as to enable the customer to access specific types of information that are of interest to the customer. The customer may do this by selecting items of information that are presented on a touch screen. Alternatively, or in addition, touch screen interfaces may be provided at the customer stations 18 if it is desired to enable customers to access information in that manner. However, in systems where high speed processing of transactions is desired, it may often be advantageous to limit customer inquiries to separate terminal stations at which a customer's inquiry will not impede the conduct of other transactions.

Thus, the new transaction system of the present invention achieves the above stated objectives, eliminates difficulties encountered in the use of prior devices and systems, solves problems, and attains the desirable results described herein. In the foregoing description, certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown or described.

In the following claims, any feature described is a means for performing a function shall be construed as encompassing any means capable of performing the recited function and shall not be deemed limited to the particular means shown performing the function in the foregoing description, or mere equivalents thereof.

Having described the features, discoveries, and principles of the invention, the manner in which it is constructed and operated and the advantages and use of results attained; the new and useful, structures, devices, elements, arrangements, parts, combinations, systems, equipment, operations, methods and relationships are set forth in the appended claims.

We claim:

1. A system comprising:
    a service provider (SP) station including:
        an SP visual display,
        an SP CCTV camera,
        an SP audio transmitting device and an SP audio receiving device,
        an SP pneumatic tube carrier delivery and receiving device,
    a plurality of customer stations, wherein each of the customer stations is in operative connection with the SP station,
        wherein at least one customer station of the plurality of customer stations includes:
            a customer visual display, wherein the customer visual display is in operative connection with the SP CCTV camera,
            a customer CCTV camera in operative connection with the SP visual display,
            a customer audio transmitting device and a customer audio receiving device in operative connection with the SP audio receiving device and SP audio transmitting device, respectively,
            a customer pneumatic tube carrier delivery and receiving device in operative connection with the SP pneumatic tube carrier delivery and receiving device, wherein a carrier is enabled to be selectively moved between the customer station and the SP station, and
    a building,
        wherein the plurality of customer stations are in the building,
        wherein the building comprises an interior area which includes an interior wall extending therein, wherein the SP station is housed in the interior area,
            wherein the at least one customer station is positioned within the interior area, and
            wherein at least one component among the customer visual display, customer CCTV camera, customer audio transmitting device, customer audio receiving device, and customer carrier delivery and receiving device of the at least one customer station is positioned within the interior area in operatively supporting connection with the interior wall,
        wherein the building includes a secure room,
            wherein the SP station is housed in the secure room,
            wherein the at least one customer station is disposed outside of the secure room.

2. A system comprising:
    a service provider (SP) station including:
        an SP visual display,
        an SP CCTV camera,
    an SP audio transmitting device and an SP audio receiving device,
        an SP pneumatic tube carrier delivery and receiving device,
    customer stations in operative with the SP station,
        wherein each of a plurality of the customer stations include a device actuatable by a customer at a customer station,
        wherein at least one customer station of the customer stations includes:
        a customer visual display, wherein the customer visual display is in operative connection with the SP CCTV camera,
            a customer CCTV camera in operative connection with the SP visual display,
            a customer audio transmitting device and a customer audio receiving device in operative connection with the SP audio receiving device and SP audio transmitting device, respectively,
            a customer pneumatic tube carrier delivery and receiving device in operative connection with the SP pneumatic tube carrier delivery and receiving device, wherein a carrier is enabled to be selectively moved between the at least one customer station and the SP station,
    a building,
        wherein the building comprises an interior area which includes an interior wall extending therein, wherein the SP station is housed in the interior area, and wherein at least one component among the customer visual display, customer CCTV camera, customer audio transmitting device, customer audio receiving device, and customer carrier delivery and receiving device of at least one the customer station is positioned within the interior area in operatively supporting connection with the interior wall,
a queuing device at the SP station,
wherein the queuing device is in operative connection with each customer actuatable device,
wherein the queuing device is operative to generate an order,
wherein the order includes data representative of a time sequence in which the actuatable devices at the plurality of the customer stations were actuated, and
wherein the queuing device is operative to indicate data responsive to the order.

3. The system according to claim 2 wherein the SP station further includes a communication selector unit, and wherein the system is operative responsive to inputs to the selector unit to selectively place the SP station in video and audio communication with one of the plurality of the customer stations, and wherein the selector unit is in operative connection with the queuing device, and wherein the queuing device is operative to remove from the order the data representative of the one customer station responsive to the selector unit operating to place the one customer station and the SP station in communication.

4. The system according to claim 3 wherein the customer actuatable device comprises a customer presence sensor, and wherein the queuing device is operative to defer placing data representative of the one customer station in the order while the SP station and the one customer station are in video and audio communication.

5. The system according to claim 4 and wherein the queuing device is operative to place data representative of the one customer station in the order again after the customer presence sensor ceases to sense the customer adjacent the one customer station subsequent to the one customer station and SP station being in communication, and thereafter again senses a customer.

6. A system comprising:
a service provider (SP) station including:
an SP visual display,
an SP CCTV camera,
an SP audio transmitting device and an SP audio receiving device,
an SP pneumatic tube carrier delivery and receiving device,
customer stations,
wherein at least one customer station of the customer stations includes:
a customer visual display, wherein the customer visual display is in operative connection with the SP CCTV camera,
a customer CCTV camera in operative connection with the SP visual display,
a customer audio transmitting device and a customer audio receiving device in operative connection with the SP audio receiving device and SP audio transmitting device, respectively,
a customer pneumatic tube carrier delivery and receiving device in operative connection with the SP pneumatic tube carrier delivery and receiving device, wherein a carrier is enabled to be selectively moved between the at least one customer station and the SP station,
a building,
wherein the building comprises an interior area which includes an interior wall extending therein,
wherein the SP station is housed in the interior area,
wherein at least one component among the customer visual display, customer CCTV camera, customer audio transmitting device, customer audio receiving device, and customer carrier delivery and receiving device of the at least one customer station is positioned within the interior area in operatively supporting connection with the interior wall,
wherein a plurality of the customer stations are positioned within the interior area,
wherein each of the plurality of the customer stations includes:
a customer visual display, wherein the customer visual display is in operative connection with the SP station,
a customer CCTV camera in operative connection with the SP station,
a customer audio transmitting device in operative connection with the SP station,
a customer audio receiving device in operative connection with the SP station, and
a customer pneumatic tube carrier delivery and receiving device in operative connection with the SP station, wherein a carrier is enabled to be selectively moved between the respective customer station and the SP station.

7. A transaction system comprising:
a building,
wherein the building includes a fixed interior wall,
wherein the interior wall includes a support frame,
wherein the building includes a secure room,
a service provider (SP) station housed in the building,
wherein the SP station is housed inside the secure room,
wherein the SP station includes SP communication devices,
wherein the SP communication devices include an SP camera device,
wherein the SP camera device is operative to generate video material,
wherein the SP station includes at least one SP pneumatic tube carrier terminal,
a plurality of customer stations housed in the building,
wherein each customer station includes customer communication devices operatively connected to the SP communication devices, enabling two way audio and video communication between a customer at each respective customer station and an SP at the SP station,
wherein the customer communication devices include a customer display device,
wherein the customer display device is operatively supported by the frame,
wherein each respective customer station includes a customer pneumatic tube carrier terminal in operative connection with the at least one SP pneumatic tube carrier terminal, enabling a carrier to be pneumatically moved between each respective customer station and the SP station,
wherein each customer pneumatic tube carrier terminal is in operatively supporting connection with the interior wall, wherein each respective customer station is located outside of the secure room,
wherein the plurality of customer stations include a first customer station, a video material presenting device,
wherein the video material presenting device is operative to provide video material to each respective customer display device, a video control device,
wherein the video control device controls presentation of video material at each respective customer display device,
wherein the video control device is operative to selectively present video material provided by the SP camera device at each respective customer display device,
wherein while a first customer at the first customer station is in two way audio and video communication with the SP at the SP station, the video control device causes video material provided by the SP camera device to be presented at the customer display device of the first customer station,
wherein the video control device is operative to selectively present video material provided by the video material presenting device at each respective customer display device,
wherein while the first customer at the first customer station is out of two way audio and video communication with the SP station, the video control device causes video material provided by the video material presenting device to be presented at the customer display device of the first customer station.

8. The transaction system according to claim 7 and further comprising a data store,
wherein the data store includes video material,
wherein the video material presenting device is in operative connection with the data store,
wherein the video material presenting device is operative to provide video material from the data store to each respective customer display device.

9. The transaction system according to claim 8
wherein the data store includes video material comprising advertising material,
wherein the video material presenting device is operative to provide advertising material from the data store to each respective customer display device.

10. The transaction system according to claim 7
wherein the video material presenting device is in operative connection with a video broadcast source,
wherein the video material presenting device is operative to provide video material from the video broadcast source to each respective customer display device.

11. The transaction system according to claim 7 and further comprising a movable user interface,
wherein the frame comprises a door frame,
wherein the user interface is operatively supported by the door frame,
wherein the user interface includes a display device opening,
wherein when the user interface is in an operative position, the display device is visible through the display device opening.

* * * * *